United States Patent
Haruna

(10) Patent No.: US 9,692,973 B2
(45) Date of Patent: Jun. 27, 2017

(54) IMAGE CAPTURING APPARATUS AND CONTROL METHOD THEREFOR

(71) Applicant: CANON KABUSHIKI KAISHA, Tokyo (JP)

(72) Inventor: Kota Haruna, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/960,660

(22) Filed: Dec. 7, 2015

(65) Prior Publication Data

US 2016/0165138 A1    Jun. 9, 2016

(30) Foreign Application Priority Data

Dec. 8, 2014 (JP) ................... 2014-248418
Oct. 20, 2015 (JP) ................... 2015-206480

(51) Int. Cl.
*H04N 5/232* (2006.01)
*H04N 5/235* (2006.01)

(52) U.S. Cl.
CPC ....... *H04N 5/23254* (2013.01); *H04N 5/2353* (2013.01); *H04N 5/23261* (2013.01); *H04N 5/23293* (2013.01)

(58) Field of Classification Search
None
See application file for complete search history.

(56) References Cited

U.S. PATENT DOCUMENTS

| 5,959,672 A | * | 9/1999 | Sasaki | H04N 19/503 375/240.14 |
| 2007/0110418 A1 | * | 5/2007 | Imada | G03B 5/04 396/55 |
| 2013/0120586 A1 | * | 5/2013 | Takashima | H04N 5/232 348/169 |

FOREIGN PATENT DOCUMENTS

| JP | 2006-317848 A | 11/2006 |
| JP | 2010-245774 A | 10/2010 |

* cited by examiner

*Primary Examiner* — Mark T Monk
(74) *Attorney, Agent, or Firm* — Cowan, Liebowitz & Latman, P.C.

(57) ABSTRACT

An image capturing apparatus comprises: a first detection unit configured to detect a panning amount of the image capturing apparatus; a second detection unit configured to detect a moving amount of a subject; and a control unit configured to perform control to display information which is related to a difference between the panning amount of the image capturing apparatus detected by the first detection unit in the exposure duration and the moving amount of the subject detected by the second detection unit before a start of the exposure, on a display unit in an exposure duration.

6 Claims, 11 Drawing Sheets

F I G. 4A
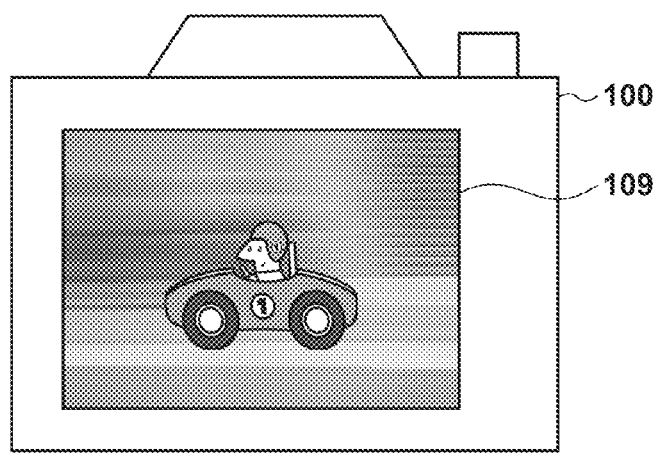
F I G. 4B
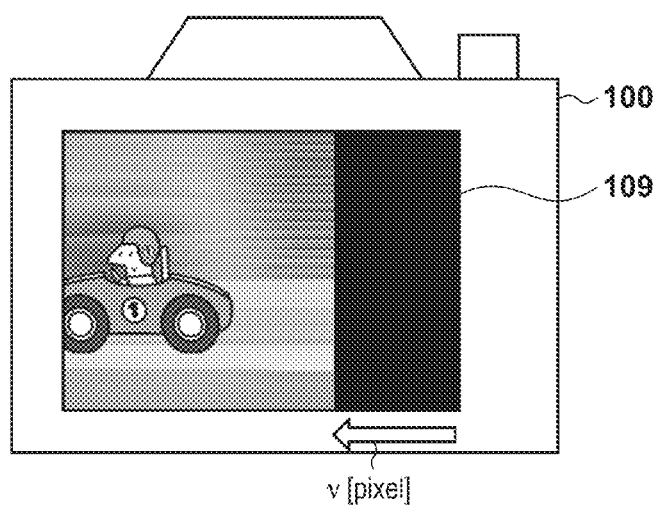
F I G. 4C
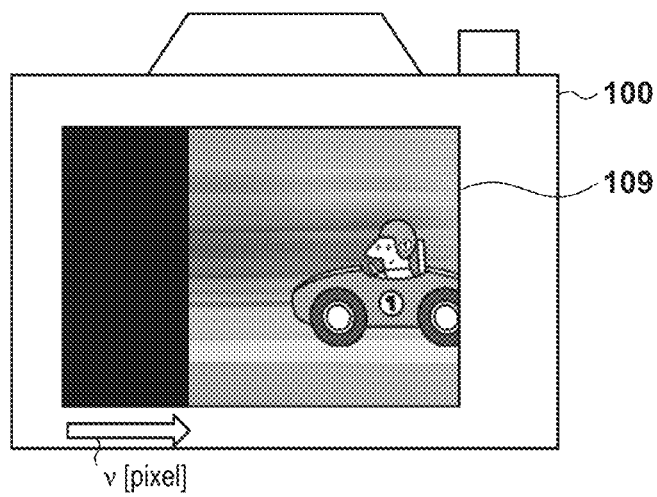

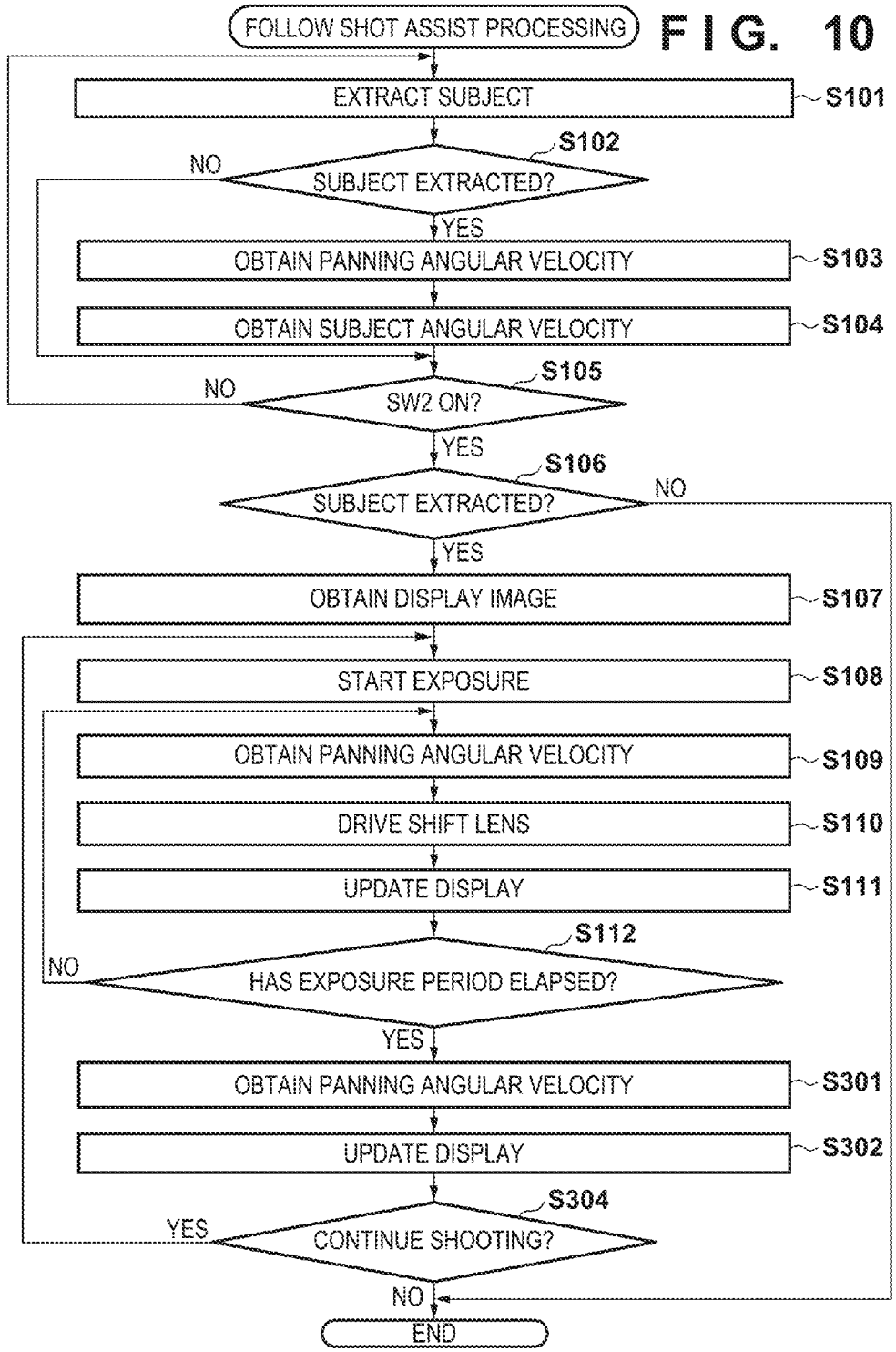

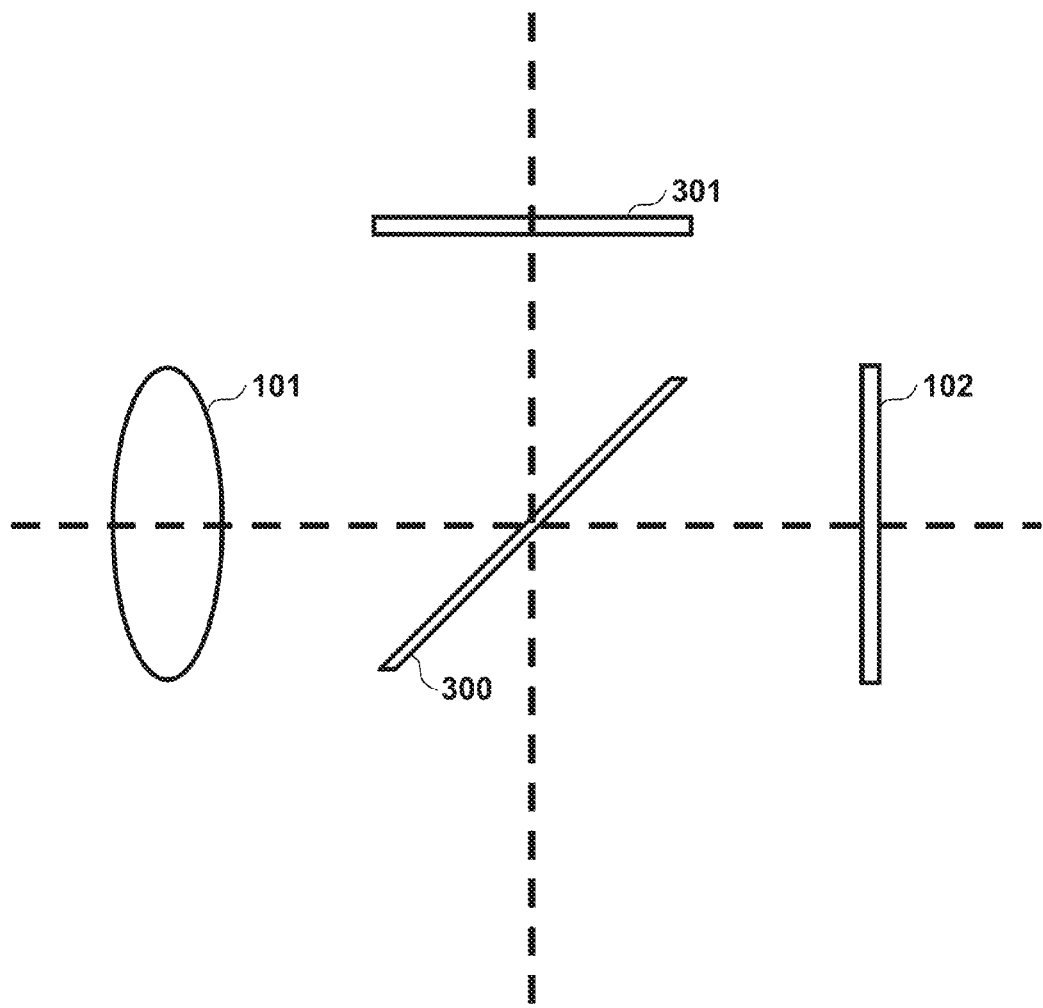

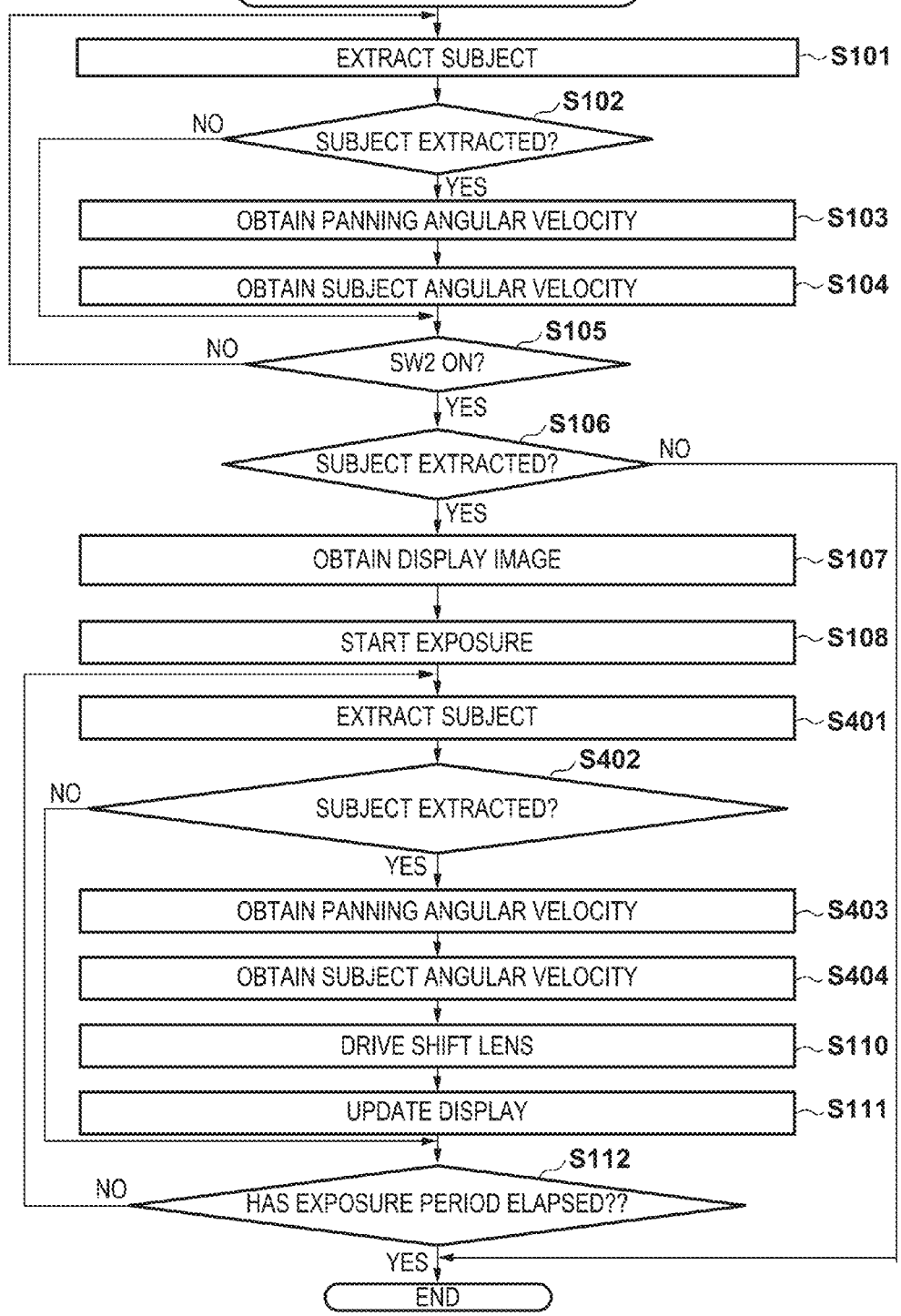

IMAGE CAPTURING APPARATUS AND CONTROL METHOD THEREFOR

BACKGROUND OF THE INVENTION

Field of the Invention

The present invention relates to an image capturing apparatus and a control method therefor, and in particular to an image capturing apparatus that assists a photographer during performing a follow shot and a control method therefor.

Description of the Related Art

There is a conventional shooting technique called a follow shot that highlights the speed of a moving subject. In the follow shot, a photographer pans a camera in accordance with the movement of a subject to obtain a still image in which the moving subject appears still while the background is streaked. In a typical follow shot, a target subject is shot by setting a longer exposure period than normal in accordance with the speed of the movement of the target subject. Japanese Patent Laid-Open No. 2010-245774 describes a configuration for a follow shot in which shooting is performed in an exposure period that secures a sufficient amount of streaking in the background.

In the follow shot, which requires a photographer to perform panning in accordance with the movement of a subject, the subject in a shot image becomes blurry if there is any difference between the speed of the movement of the subject and the panning speed as a result of performing the follow shot too fast or too slow. In view of this problem, a technique to assist the follow shot has been suggested, in particular a method of reducing the difference between the speed of the movement of a subject and the panning speed by moving a shift lens. Japanese Patent Laid-Open No. 2006-317848 discloses the following configuration. First, vibration is detected using a gyroscope, a subject is detected from motion vectors of an image, and a correction amount for positioning the detected subject at the center of the image is calculated. Then, the follow shot is performed while correcting the blur by moving an optical axis shift lens based on the calculated correction amount.

However, as the optical axis shift lens described in Japanese Patent Laid-Open No. 2006-317848 has a movable range that is predetermined, the maximum amount of correction that can be made by a blur correction system (hereinafter, "maximum correctable angle") is limited, thereby giving rise to the possibility that correction cannot be made thoroughly under some circumstances.

Now, assume a situation shown in FIG. 9. FIG. 9 shows the speed of a subject and the panning speed of a camera as angular velocities, with the principal point serving as the center thereof. As shown in FIG. 9, in a case where an angular velocity of the subject is 30 deg/sec and a panning angular velocity of the camera is 24 deg/sec, a system needs to compensate for the difference therebetween, i.e., 6 deg/sec. The product of such an angular velocity that the system compensates for and an exposure period is a final correction angle that needs to be compensated for by the system.

Assume, for example, the case of shooting in which the maximum correctable angle for a shift lens is 0.4 degrees and an exposure period is 1/16 seconds; in this case, the final correction angle required is given by the following Expression (1).

$$6 \times (1/16) = 0.375 (\leq 0.4) \quad (1)$$

In this case, correction can be made as the correction angle is equal to or smaller than the maximum correctable angle of 0.4 degrees.

Now, assume the case of shooting with an exposure period of 1/8 seconds; in this case, the final correction angle required is as follows.

$$6 \times (1/8) = 0.75 (>0.4) \quad (2)$$

In this case, correction cannot be made as the correction angle exceeds the maximum correctable angle of 0.4 degrees.

As described above, in order to obtain an image without a blurry subject, a photographer needs to adjust the panning speed in accordance with the movement of the subject also in an exposure duration.

While image capturing apparatuses equipped with an electronic viewfinder are widely used, generally it is often the case that, during the exposure, a display screen of the electronic viewfinder displays nothing, or keeps displaying the last image obtained before the start of the exposure. Under such circumstances, it is extremely difficult for the photographer to keep adjusting the panning speed in accordance with the movement of a subject. Furthermore, if nothing is displayed on the display screen of the electronic viewfinder during the exposure, a photographer who is not used to the follow shot may stop panning.

SUMMARY OF THE INVENTION

The present invention has been made in consideration of the above situation, and makes it easy for a photographer to track a subject during performing the follow shot.

According to the present invention, provided is an image capturing apparatus comprising: a first detection unit configured to detect a panning amount of the image capturing apparatus; a second detection unit configured to detect a moving amount of a subject; and a control unit configured to perform control to display information which is related to a difference between the panning amount of the image capturing apparatus detected by the first detection unit in the exposure duration and the moving amount of the subject detected by the second detection unit before a start of the exposure, on a display unit in an exposure duration.

Further, according to the present invention, provided is an image capturing apparatus comprising: a first detection unit configured to detect a panning amount of the image capturing apparatus; a second detection unit configured to detect a moving amount of a subject; and a control unit configured to perform control to display information which is related to a difference between the panning amount of the image capturing apparatus detected by the first detection unit in the exposure duration and the moving amount of the subject detected by the second detection unit, on a display unit in an exposure duration.

Furthermore, according to the present invention, provided is a control method for an image capturing apparatus, the control method comprising: detecting a panning amount of the image capturing apparatus; detecting a moving amount of a subject; and displaying information which is related to a difference between the detected panning amount of the image capturing apparatus in the exposure duration and the detected moving amount of the subject before a start of the exposure, on a display unit in an exposure duration.

Further, according to the present invention, provided is a control method for an image capturing apparatus, the control method comprising: detecting a panning amount of the image capturing apparatus; detecting a moving amount of a subject; and displaying information which is related to a difference between the detected panning amount of the image capturing apparatus in the exposure duration and the detected moving amount of the subject, on a display unit in an exposure duration.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A to 4C show examples of display on a display screen according to the first embodiment;

FIG. 10 is a flowchart of follow shot assist processing according to a third embodiment;

FIG. 11 illustrates a configuration for calculating an angular velocity of a subject during exposure according to a fourth embodiment; and FIG. 12 is a flowchart of follow shot assist processing according to the fourth embodiment.

DESCRIPTION OF THE EMBODIMENTS

Exemplary embodiments of the present invention will be described in detail in accordance with the accompanying drawings.

First Embodiment

Figure 1:
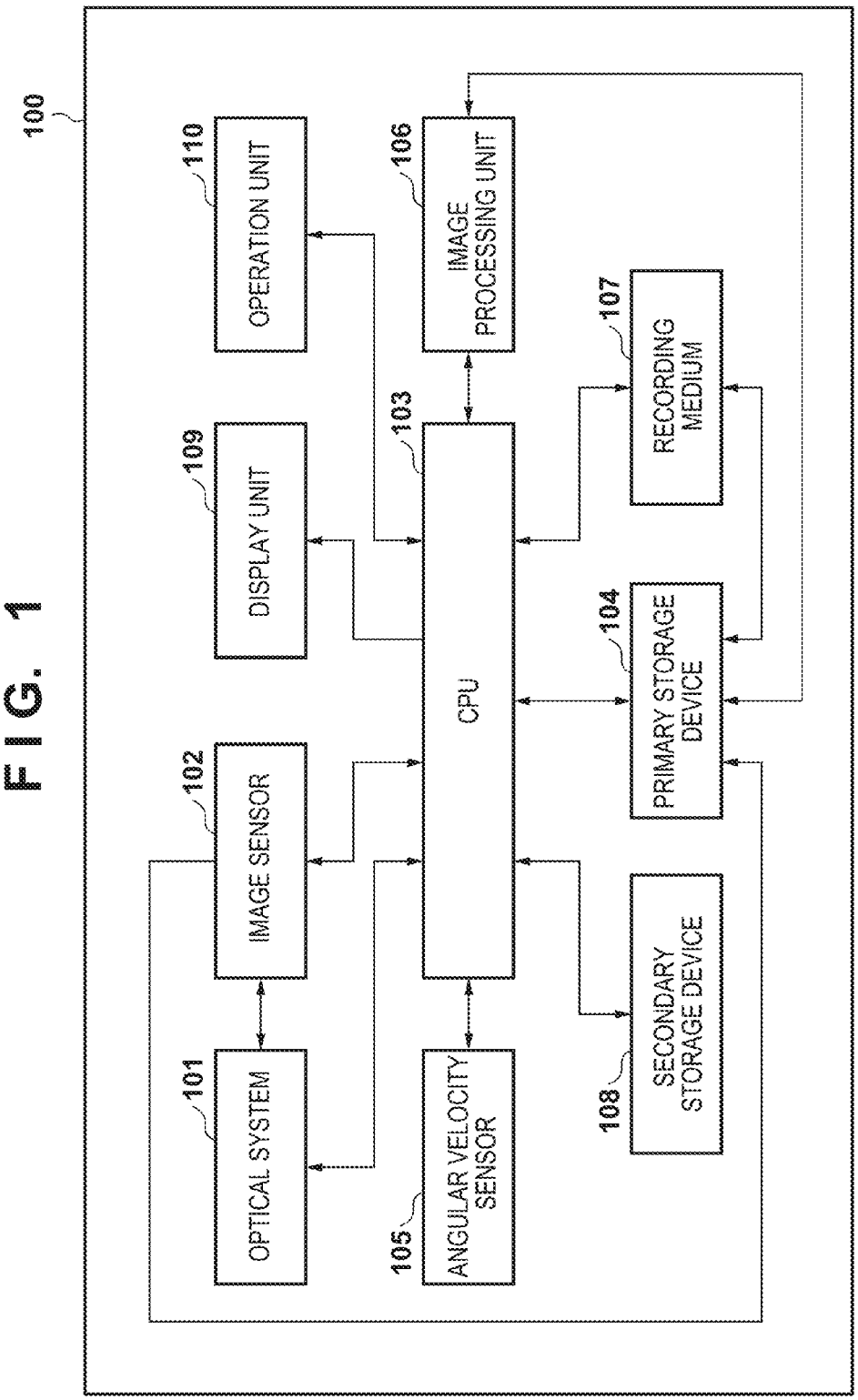
FIG. 1 is a block diagram showing a schematic configuration of an image capturing apparatus according to an embodiment of the present invention.

FIG. 1 is a block diagram showing a schematic configuration of an image capturing apparatus 100, which exemplarily embodies an image processing apparatus according to an embodiment of the present invention. The image capturing apparatus 100 may be a digital camera, a digital video camera, and any electronic device with a camera function, such as a mobile telephone with a camera function and a camera-equipped computer.

An optical system 101 includes lenses, a shutter, and a diaphragm, and forms light from a subject onto an image sensor 102 under control by a CPU 103. It also includes a shift lens that is used in later-described follow shot assist processing, and that can be driven in the direction perpendicular to the optical axis. Note that the optical system 101 may be configured in an attachable/removable manner. The image sensor 102 is constituted by, for example, a CCD image sensor or a CMOS image sensor, and converts the light formed via the optical system 101 into an image signal.

An angular velocity sensor 105, which is a gyroscope or the like, cyclically detects an angular velocity indicating a moving amount of the image capturing apparatus 100 equipped with the angular velocity sensor 105, converts the angular velocity into an electrical signal, and transmits the electrical signal to the CPU 103. The CPU 103 realizes functions of the image capturing apparatus 100 by controlling components of the image capturing apparatus 100 in accordance with an input signal and a prestored program. A primary storage device 104, which is a RAM or a similar volatile memory, stores temporary data and is used for tasks performed by the CPU 103. Information stored in the primary storage device 104 may be used by an image processing unit 106, and may be recorded to a recording medium 107. A secondary storage device 108, which is an EEPROM or a similar nonvolatile memory, stores a program (firmware) and various types of setting information for controlling the image capturing apparatus 100, and is used by the CPU 103.

For example, data of shot images stored in the primary storage device 104 is recorded to the recording medium 107. Note that the recording medium 107 is removable from the image capturing apparatus 100 in a manner similar to, for example, a semiconductor memory card, and data recorded therein can be read out by attaching the recording medium 107 to a personal computer and the like. That is to say, the image capturing apparatus 100 has a mechanism that allows for attachment/removal of the recording medium 107, as well as a function of reading out from and writing to the same.

A display unit 109 has a function of an electronic viewfinder, and displays shot images, GUI images for interactive operation, and the like. An operation unit 110 represents a group of input devices for accepting a user operation and transmitting input information to the CPU 103, and may be input equipment that utilizes, for example, sound and eye tracking, buttons, levers, touchscreens, etc. The operation unit 110 also includes a release button configured as a so-called two-stage switch; a non-illustrated switch SW1 is turned ON when the release button is pressed halfway down, and a non-illustrated switch SW2 is turned ON when the release button is pressed all the way down. An instruction for starting shooting preparation operation, including a focus detection operation, is issued when the switch SW1 is turned ON, and an instruction for starting a shooting operation is issued when the switch SW2 is turned ON.

In the image capturing apparatus 100 according to the present embodiment, the image processing unit 106 has a plurality of patterns of image processing to be applied to a shot image; the plurality of patterns represent a plurality of shooting modes, and any of such patterns can be selectively set by the operation unit 110. In addition, the image processing unit 106, for example, executes image processing called development processing, and adjusts color tones in accordance with the shooting mode. Note that at least some functions of the image processing unit 106 may be realized as a software using the CPU 103.

Figure 2:
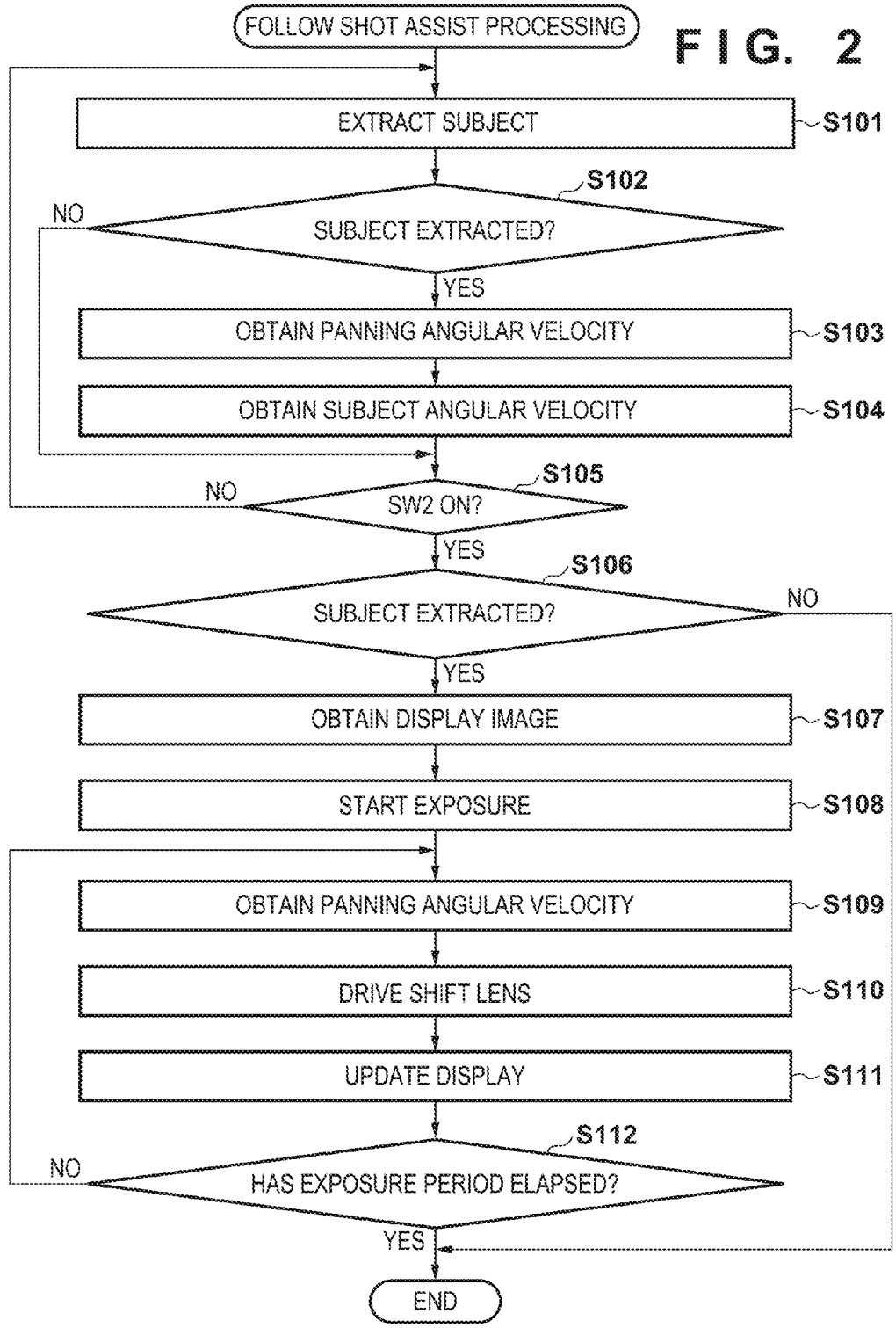
FIG. 2 is a flowchart of follow shot assist processing according to a first embodiment.

FIG. 2 is a flowchart of follow shot assist processing according to the first embodiment. A description is now given of the follow shot assist processing according to the first embodiment with reference to FIG. 2. Note that the processing shown in FIG. 2 is executed when a shooting mode for executing the follow shot assist processing has been set, and is started, for example, when the switch SW1 is turned ON by pressing the release button included in the operation unit 110 halfway down. When the switch SW1 is in the ON state, the electronic viewfinder exerts a function of reading out an image from the image sensor 102 at a predetermined cycle and displaying the read out image on the display unit 109.

First, in step S101 of FIG. 2, the CPU 103 obtains an image from the image sensor 102, and extracts a subject from the obtained image. Note that the subject can be extracted using various methods that have been conventionally suggested, including a method disclosed in Japanese Patent Laid-Open No. 2006-317848 in which a subject area is extracted using motion vectors obtained from a shot image; thus, a detailed description of extraction of the subject is omitted here.

If the subject has been successfully extracted (YES of step S102), the CPU 103 proceeds to step S103, obtains the angular velocity (panning angular velocity) of the image capturing apparatus 100 detected by the angular velocity sensor 105, and then proceeds to step S104. In step S104, the CPU 103 calculates the angular velocity (moving amount) of the subject extracted in step S101. In the present embodiment, the angular velocity of the subject is calculated with the principal point serving as the center, so as to perform calculation using the panning angular velocity of the image capturing apparatus 100.

Figure 3A:
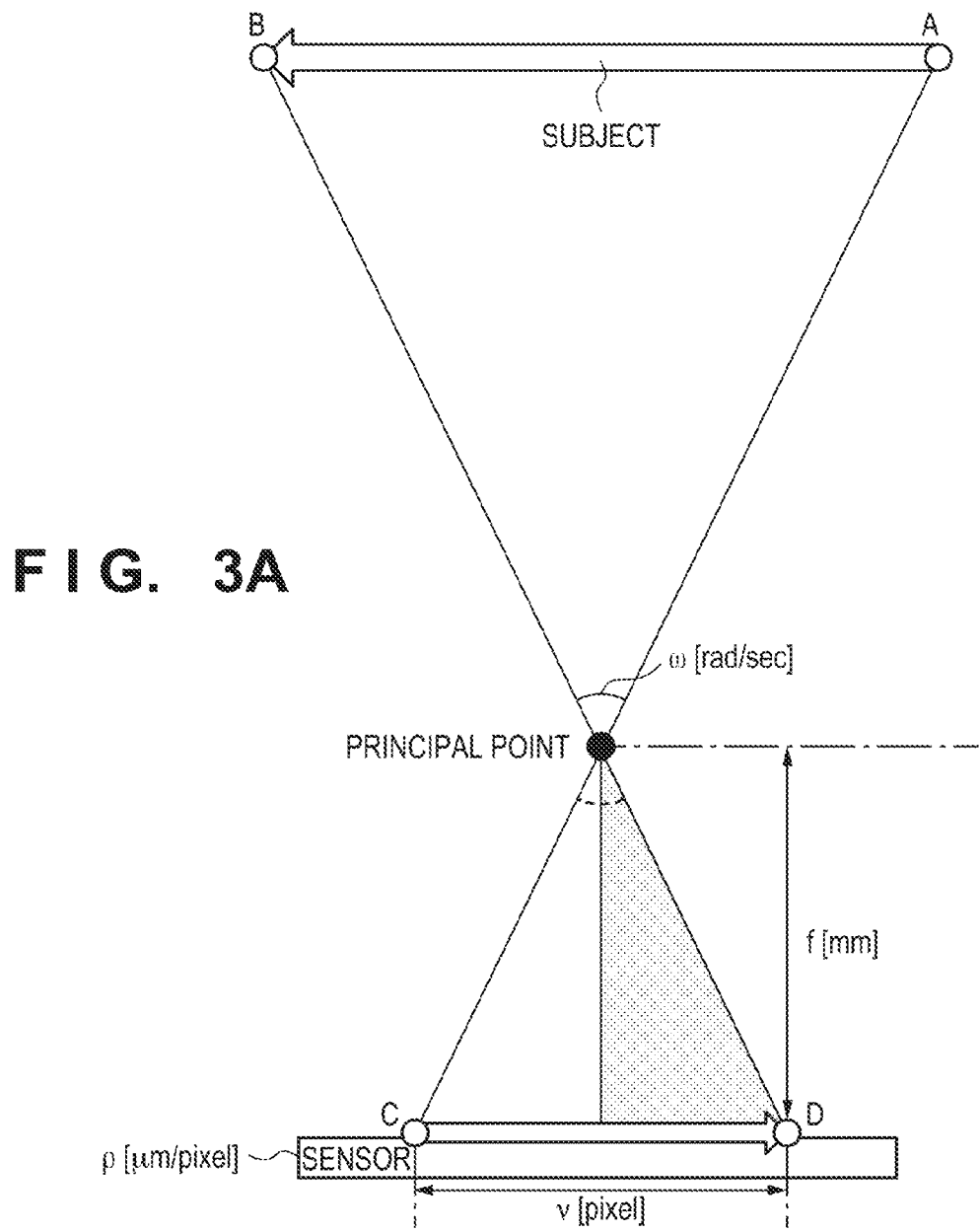
FIGS. 3A and 3B illustrate a method of calculating an angular velocity of a subject according to the first embodiment.
Figure 3B:
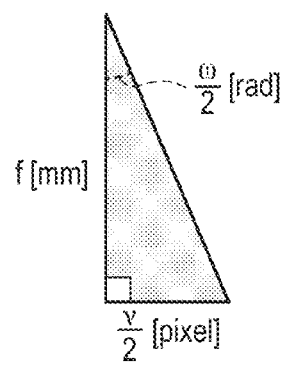

A method of calculating the angular velocity of the subject will now be described with reference to FIGS. 3A and 3B. FIG. 3A shows the movement of the subject from point A to point B in t seconds, and the consequent movement of the image of the subject formed on the image sensor 102 from point C to point D. FIG. 3B shows a cutout of a hatched portion in FIG. 3A. Provided that the distance between points C and D is v [pixels], the focal length is f [mm], and the pixel pitch of the image sensor 102 is p [μm/pixel], the angular velocity ω [rad/sec] of the subject on an imaging plane is given by the following Expression (3), as apparent from FIG. 3B.

$$\tan\frac{\omega}{2}[\text{rad/sec}] = \qquad (3)$$

$$\frac{v}{2}[\text{pixel}] \times \frac{p}{1000}[\text{mm/pixel}] \div t[\text{sec}] \div f[\text{mm}] = \frac{vp}{2000\,tf}$$

$$\omega = 2\tan^{-1}\left(\frac{vp}{2000\,tf}\right)[\text{rad/sec}]$$

Here, in a case where the image capturing apparatus 100 is being panned, the angular velocity ω of the subject on the imaging plane is obtained by subtracting the panning angular velocity $\omega_p$ from the angular velocity of the subject (hereinafter, "subject angular velocity") $\omega_s$, as indicated by the following Expression (4).

$$\omega = \omega_s - \omega_p \qquad (4)$$

Based on the above Expression (4), the subject angular velocity $\omega_s$ can be obtained using the following Expression (5).

$$\omega_s = \omega + \omega_p \qquad (5)$$

Note that the subject angular velocity $\omega_s$ is not limited to being obtained using the foregoing calculation method, and can be obtained using values that have been designated by the operation unit 110 in advance.

Next, in step S105, the CPU 103 determines whether the switch SW2 has been turned ON due to the release button included in the operation unit 110 being pressed all the way down. If the switch SW2 is not ON (NO of step S105), operations of steps S101 to S104 are repeatedly performed.

On the other hand, if the switch SW2 has been turned ON (YES of step S105), the processing proceeds to step S106.

Note that if the subject has not been successfully extracted in step S101, the subject angular velocity cannot be calculated, and thus the follow shot assist does not function. In this case, the processing proceeds to step S105 to check whether the switch SW2 is ON without executing the processes of steps S103 and S104, and if it is not ON, the processing returns to step S101 to repeat the process of extracting a subject from an image that has been newly read out from the image sensor 102.

In step S106, whether the subject has been successfully extracted is determined once more. If the subject has not been successfully extracted, the follow shot assist processing is ended as it cannot be executed. In this case, the display unit 109 displays either nothing or an image obtained before the switch SW2 was turned ON, as in conventional cases.

On the other hand, if the subject has been successfully extracted, the processing proceeds to step S107, and the CPU 103 stores, to the primary storage device 104, an image captured by the image sensor 102 as a display image that indicates the position of the subject during the shooting. It is preferable that the display image be an image that is displayed at the timing closest to the timing at which the switch SW2 is turned ON. However, the display image may be an image shot at any timing before step S105, or may be an image that has been designated in advance from among images recorded in the recording medium 107. Alternatively, the display image may be an image or a graphic that has been designated in advance from among images or graphics stored in the secondary storage device 108.

Next, in step S108, the CPU 103 controls the shutter included in the optical system 101 so that the shutter starts to travel. Then, in step S109, the CPU 103 obtains the panning angular velocity $\omega_p$ of the image capturing apparatus 100 detected by the angular velocity sensor 105. Thereafter, in step S110, the shift lens of the optical system 101 is driven so as to reduce blurring of the subject based on the difference between the panning angular velocity $\omega_p$ obtained in step S109 and the subject angular velocity $\omega_s$ obtained in step S104.

The CPU 103 then updates display on a display screen of the display unit 109 in step S111. Here, the CPU 103 calculates the display position of the image designated in step S107 on the display unit 109, and displays the image at the calculated display position. The angular velocity ω of the subject on the imaging plane can be obtained using Expression (4) based on the panning angular velocity $\omega_p$ obtained in step S109 and on the subject angular velocity $\omega_s$ calculated in step S104. The angular velocity ω of the subject on the imaging plane is further converted into a moving distance v [pixels] on the imaging plane using the following Expression (6), which is derived from Expression (3).

$$v = (2{,}000\,tf/p) \times \tan(\omega/2) \qquad (6)$$

Note that a time period t [sec] is given by the following expression (7) based on a frequency n [1/sec] at which display is updated.

$$t = 1/n \qquad (7)$$

The CPU 103 then updates display on the display screen in accordance with the moving distance v on the imaging plane thus obtained.

Examples of display on the display screen will now be described with reference to FIGS. 4A to 4C. FIG. 4A shows an example of display on the display screen immediately after the start of the exposure. Immediately after the start of the exposure, the display image obtained in step S107 is displayed across the entire display screen of the display unit 109 (reference position). FIG. 4B shows an example of the display screen after display has been updated in a case where the moving distance v satisfies the relationship v>0. The moving distance v is positive when the angular velocity ω of the subject on the imaging plane is positive, i.e., when the relationship $\omega_s > \omega_p$ is derived from Expression (4), meaning that panning is not keeping up with the movement of the subject. In this case, the display position is shifted leftward by the moving distance v within the display screen, and the display image is displayed at the shifted display position. FIG. 4C shows an example of the display screen after display has been updated in a case where the moving distance v satisfies the relationship v<0. When the panning angular velocity $\omega_p$ is greater than the subject angular velocity $\omega_s$, the moving distance is negative, in which case the display position is shifted rightward by the moving distance v within the display screen, and the display image is displayed at the shifted display position.

Although the leftward camera panning direction is considered a forward direction in the present embodiment, the rightward camera panning direction may be considered a forward direction. Furthermore, the image is not limited to being moved leftward and rightward, and may be moved upward, downward, or diagonally in accordance with a panning direction.

After display on the display screen has been updated in step S111, the processing proceeds to step S112 to determine whether an exposure period has elapsed. If the exposure period has not elapsed, the processing returns to step S109 and the foregoing processes are repeated; if the exposure period has elapsed, the processing is ended.

As described above, the first embodiment can inform the photographer of deviation of the panning angular velocity from the subject angular velocity, even in the exposure duration, thereby enabling adjustment of the panning angular velocity such that the display image fits within the display screen. In addition, the photographer can be prevented from stopping the panning during the exposure.

In step S111 of the above-described first embodiment, the angular velocity of the subject on the imaging plane is calculated from the panning angular velocity and the subject angular velocity, and the display position is calculated through conversion into the moving distance on the imaging plane using Expression (6). However, the present invention is not limited to using this method; for example, the result of driving of the shift lens in step S110 may be obtained and used in calculation of the display position.

Furthermore, although the first embodiment has described an example in which the image forming position of the subject is corrected using the shift lens, the present invention is not limited in this way; for example, the image forming position of the subject can be corrected by shifting the image sensor 102.

Second Embodiment

The first embodiment has described an example in which the display position of an image on the display screen is calculated from the difference between the panning angular velocity $\omega_p$ and the subject angular velocity $\omega_s$, and display on the display screen is updated accordingly. Here, for example, if the difference between the panning angular velocity $\omega_p$ and the subject angular velocity $\omega_s$ is always constant as shown in FIG. 5, a final angle θ that needs to be corrected is given by the following Expression (8), provided that a differential angular velocity is $\omega_r$ and an exposure period is t.

$$\theta = \omega_r \times t \quad (8)$$

Figure 5:
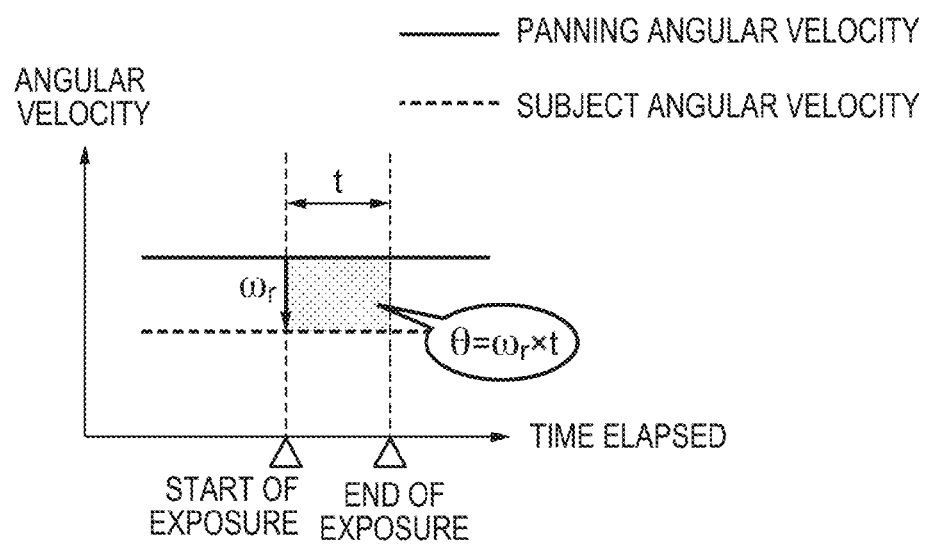
FIG. 5 shows an example of a final correction angle according to a second embodiment.

This angle θ is equivalent to a hatched area shown in FIG. 5. If the angle θ exceeds the maximum correctable angle $\theta_{max}$ [deg], i.e., the maximum angle of correction that can be made by the shift lens of the optical system 101, a blur correction system cannot correct the difference between the panning angular velocity and the subject angular velocity. This results in a blurry image, that is to say, the image shot through panning does not have the effects desired by a user.

Figure 6:
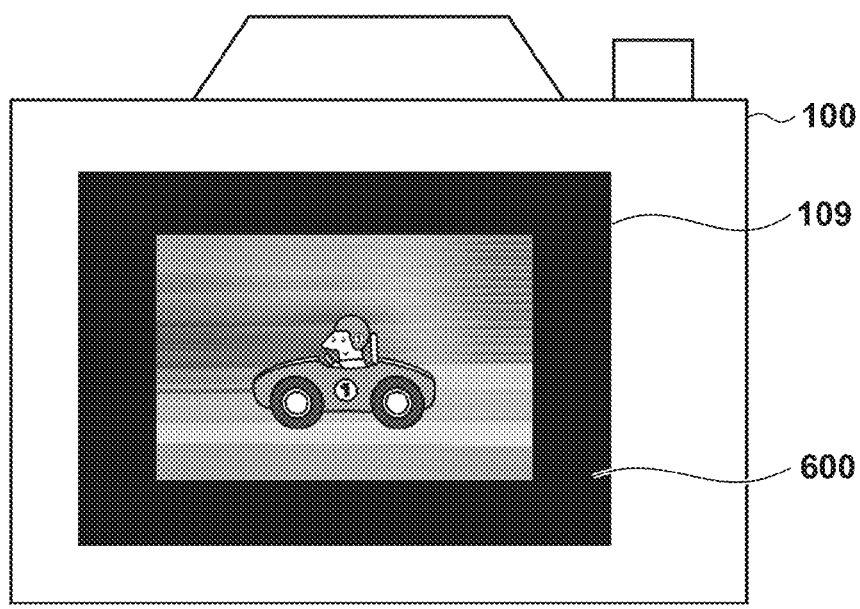
FIG. 6 shows an example of display on the display screen according to the second embodiment.

In view of this problem, for example, the present second embodiment simultaneously displays the maximum movable range that allows for correction and the current position of a subject as shown in FIG. 6, thereby informing the user of how much of a margin is left before reaching the maximum correctable angle. This method can lower the possibility that the angle of correction that needs to be made exceeds the maximum correctable angle. The second embodiment describes an example in which the display position v' of the subject is calculated under the assumption that the entire display screen represents the maximum movable range that allows for correction.

Note that the second embodiment differs from the first embodiment in a method of calculating a display position in the process of updating display in step S111; in other regards, configurations and processes according to the second embodiment are similar to those described in the first embodiment, and a description of such similar aspects is omitted here.

Figure 7:
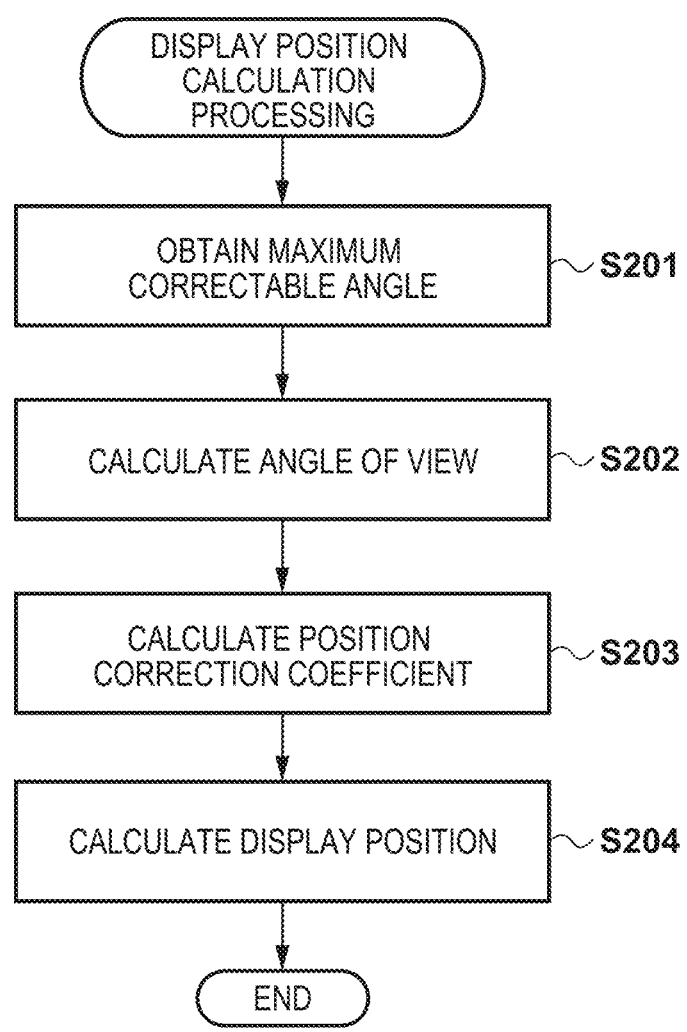
FIG. 7 is a flowchart of display position calculation processing according to the second embodiment.

FIG. 7 is a flowchart of processing for calculating a display position in the second embodiment, which is executed in step S111 of FIG. 2. First, in step S201, the CPU 103 obtains the maximum correctable angle $\theta_{max}$ for the shift lens. For example, in a case where the optical system 101 is a built-in optical system, the maximum correctable angle $\theta_{max}$ for the optical system 101 can be recorded to, for example, the secondary storage device 108 in advance, and the maximum correctable angle $\theta_{max}$ thus recorded can be read out. In a case where the optical system 101 is a removable optical system, the maximum correctable angle $\theta_{max}$ can be obtained via communication with the optical system 101 in an attached state; alternatively, the maximum correctable angle $\theta_{max}$ corresponding to the optical system can be recorded to, for example, the secondary storage device 108 in advance, and the maximum correctable angle $\theta_{max}$ thus recorded can be read out.

Figure 8A:
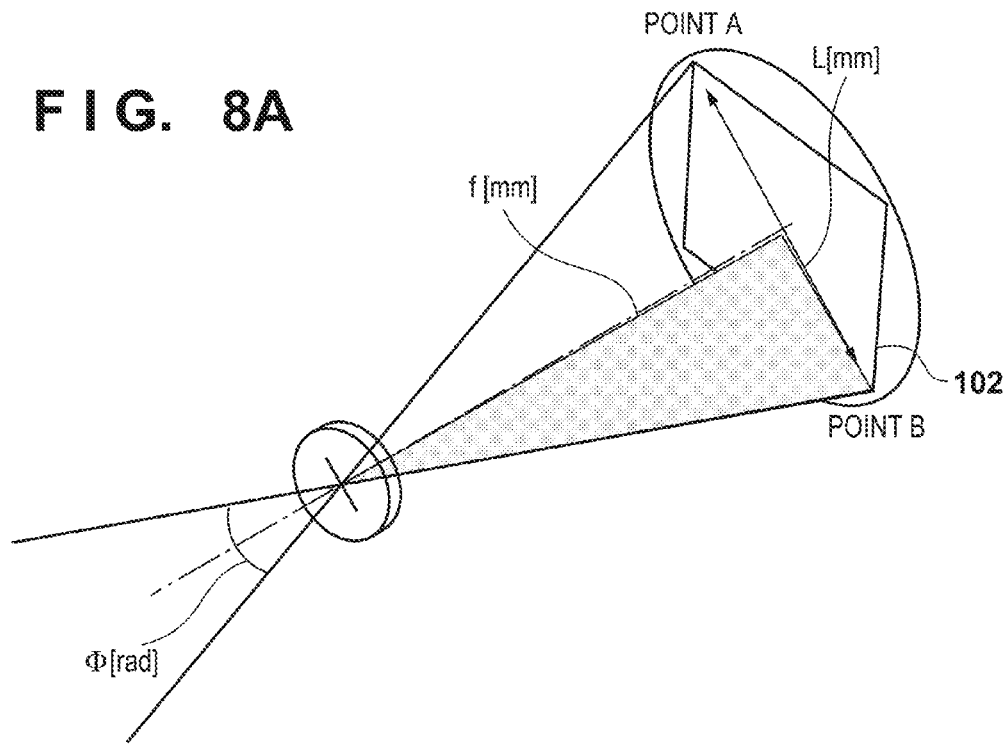
FIGS. 8A and 8B illustrate a method of calculating an angle of view according to the second embodiment.
Figure 8B:
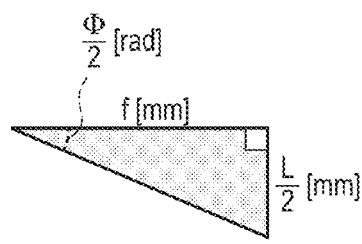
Figure 9:
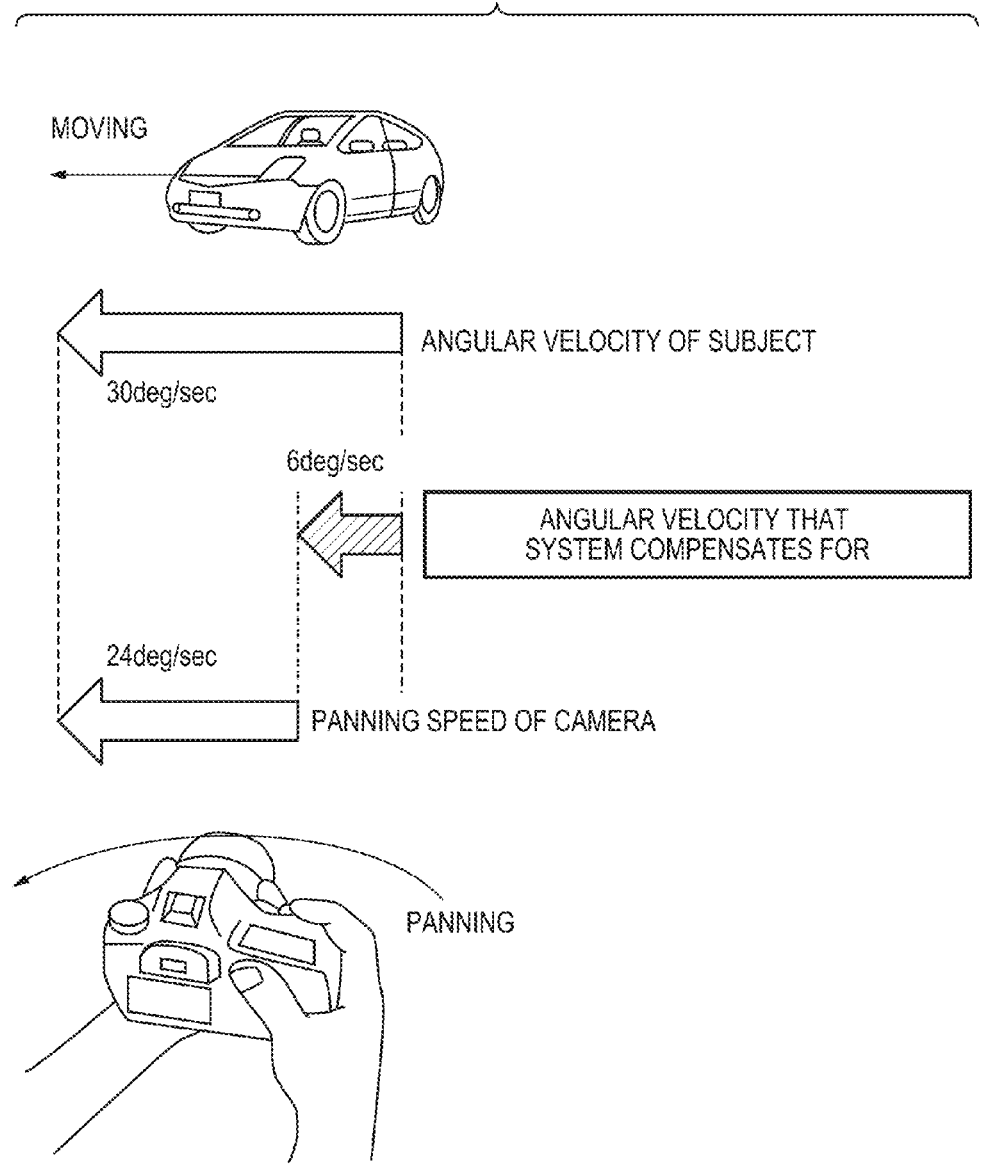
FIG. 9 illustrates the general idea of operation in the present invention.

Next, in step S202, the CPU 103 calculates an angle of view. A method of calculating the angle of view will now be described with reference to FIGS. 8A and 8B. As shown in FIG. 8A, the angle of view Φ [rad] is an angle formed by intersection of straight lines passing through points A and B on the image sensor 102 at a position that is on the optical axis and is distant by the focal length f [mm]. FIG. 8B shows a cutout of a hatched portion in FIG. 8A. Provided that a length (a length of a diagonal) between points A and B is L [mm], the angle of view Φ is given by the following Expression (9), as apparent from FIG. 8B.

$$\tan(\Phi/2) = (L/2) \div f$$

$$\Phi = 2 \tan^{-1}(L/2f) \quad (9)$$

The CPU 103 obtains the focal length via communication with the optical system 101, obtains the length of the diagonal of the image sensor 102, which has been recorded to, for example, the secondary storage device 108 in advance, and calculates the angle of view using Expression (9). Alternatively, the angle of view corresponding to the focal length can be recorded to, for example, the secondary storage device 108 in advance, and the angle of view thus recorded can be read out.

Next, in step S203, the CPU 103 calculates a position correction coefficient α. The position correction coefficient α can be obtained using the following Expression (10).

$$\alpha = \Phi/(\Phi + \theta_{max} \times 2) \tag{10}$$

The denominator in Expression (10) is equivalent to the maximum movable range that allows for correction. As opposed to the above-described first embodiment in which the display image and the display screen have the same size, the second embodiment makes it possible to obtain the size of an image for a case in which the entire display screen represents the maximum movable range that allows for correction, by multiplying both the width and height of the image by the position correction coefficient α.

In step S704, the CPU 103 calculates the display position using the position correction coefficient α. Here, v' is obtained by multiplying the moving distance v on the imaging plane obtained in a manner described in the first embodiment by the position correction coefficient α. Updating the display position of the image within the display screen in accordance with v' enables display of the position of the subject for a case in which the entire display screen represents the maximum movable range that allows for correction.

As described above, the second embodiment can inform a photographer of whether a display image has reached the end of the display screen, even in the exposure duration, thereby making it easy to confirm whether the maximum correctable angle for the shift lens has been exceeded.

Although the entire display screen represents the maximum movable range that allows for correction by the shift lens in the present second embodiment, a reasonable range within the display screen can also represent the maximum movable range that allows for correction. Furthermore, the maximum movable range can be determined on the basis of the size of the display image by obtaining the reciprocal of Expression (10) as a correction coefficient and then multiplying both the width and height of the image by the correction coefficient. In this case, the display image can be moved within the maximum movable range, which is outside the display screen. Moreover, when the display image exceeds the maximum movable range that allows for correction, a display method can be switched. In one example, image update is not performed when the display image exceeds the maximum movable range that allows for correction.

Third Embodiment

In the case of burst shooting, panning must be performed in accordance with the movement of a subject not only during the exposure, but also in between shooting operations. Conventionally, in burst shooting, an image that has been shot most recently is displayed until the next shooting is performed. With such a display method, it is extremely difficult for a photographer to perform panning in accordance with the movement of a subject not only during the exposure, but also in between shooting operations.

In view of this problem, the third embodiment displays the current position of a subject also for the duration of a period between the completion of exposure and the start of the next exposure.

Note that the third embodiment differs from the first embodiment in the processes of step S112 and subsequent steps; in other regards, configurations and processes according to the third embodiment are similar to those described in the first embodiment, and a description of such similar aspects is omitted here.

FIG. 10 is a flowchart of follow shot assist processing according to the third embodiment. If the CPU 103 determines in step S112 that an exposure period has elapsed, it proceeds to step S301 and obtains the panning angular velocity of the image capturing apparatus 100 detected by the angular velocity sensor 105. Note that the substance of the process of step S301 is similar to that of step S103. Next, in step S302, the CPU 103 updates display on the display screen of the display unit 109. Here, the CPU 103 calculates the display position of the image designated in step S107 on the display unit 109, and displays the image at the calculated display position. Note that the substance of the process of step S302 is similar to that of step S111. Finally, in step S304, the CPU 103 determines whether to continue shooting. If it is determined that shooting is to be continued, the processing returns to step S108 and the exposure is started.

As described above, the third embodiment enables the photographer to adjust the panning angular velocity in accordance with the movement of a subject, also in between shooting operations.

Fourth Embodiment

The first to third embodiments have described an example in which the position of a subject during the exposure is calculated using the subject angular velocity calculated before shooting, and display on the display screen is updated accordingly. However, in these embodiments, the position of the subject cannot be displayed correctly if the subject angular velocity changes during the exposure.

In view of this problem, the fourth embodiment describes an example in which the subject angular velocity during the exposure is calculated using a configuration shown in FIG. 11. Due to a half-silvered mirror that is arranged between the optical system 101 and the image sensor 102 diagonally with respect to the optical axis, light that has passed through the optical system 101 splits into transmitted light that is transmitted through the half-silvered mirror and reflected light that is reflected by the half-silvered mirror at 90 degrees. The transmitted light is received by the image sensor 102, whereas the reflected light is received by a sensor 301 and photoelectrically converted into an image signal. The image signal obtained from the sensor 301 is used in live-view display.

FIG. 12 is a flowchart of follow shot assist processing according to the fourth embodiment. Note that the fourth embodiment differs from the first embodiment in the processes from step S108 to step S110, i.e., from the start of the exposure to driving of the shift lens; in other regards, configurations and processes according to the fourth embodiment are similar to those described in the first embodiment, and a description of such similar aspects is omitted here.

The CPU 103 drives the image sensor 102, and starts the exposure in step S108. Next, in step S401, the CPU 103 obtains an image by driving the sensor 301, and extracts a subject from the obtained image. Note that substance of this process is similar to that of step S101. If the subject has been successfully extracted (YES of step S402), the process proceeds to step S403, where the CPU 103 obtains the panning angular velocity detected by the angular velocity sensor 105, and then proceeds to step S404. In step S404, the CPU 103 calculates the angular velocity of the subject extracted in step S401. Then, in step S110, the shift lens of the optical system 101 is driven so as to reduce blurring of the subject based on the difference between the panning angular velocity $\omega_p$ obtained in step S403 and the subject angular velocity $\omega_s$ obtained in step S404.

In step S111, the CPU 103 updates display on the display screen of the display unit 109. Here, the CPU 103 calculates the display position of the image designated in step S107 on the display unit 109 using the subject angular velocity $\omega_s$ obtained in step S404, and displays the image at the calculated display position.

As described above, the fourth embodiment enables correct display of the position of the subject, even if the subject angular velocity changes during the exposure. This makes it easy for a photographer to perform panning in accordance with the movement of the subject.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-248418, filed on Dec. 8, 2014 and 2015-206480, filed Oct. 20, 2015, which are hereby incorporated by reference herein in their entirety.

What is claimed is:

1. An image capturing apparatus comprising:
   a first detection unit configured to detect a panning amount of the image capturing apparatus;
   a second detection unit configured to detect a moving amount of a subject;
   and a control unit configured to perform control to display information which is related to a calculated difference between the panning amount of the image capturing apparatus detected by the first detection unit in the exposure duration and the moving amount of the subject detected by the second detection unit before a start of the exposure, on a display unit in an exposure duration.

2. The image capturing apparatus according to claim 1, wherein the control unit displays a preset image on the display unit in the exposure duration, the preset image indicating an angle of view of an image including the subject, the display being performed while changing a display position based on the difference between the panning amount of the image capturing apparatus detected by the first detection unit in the exposure duration and the moving amount of the subject detected by the second detection unit before the start of the exposure, and the changing being based on a reference position, which is a display position at the start of the exposure.

3. The image capturing apparatus according to claim 2, wherein the preset image is an image that is displayed on the display unit at a timing closest to the start of the exposure.

4. The image capturing apparatus according to claim 2, wherein the preset image is an image that is selected from among images shot before the start of the exposure.

5. The image capturing apparatus according to claim 2, further comprising an optical correction unit that corrects the difference between the panning amount of the image capturing apparatus and the moving amount of the subject,
   wherein a correctable range that allows for correction by the optical correction unit is displayed on the display unit, together with the preset image.

6. A control method for an image capturing apparatus, the control method comprising:
   detecting a panning amount of the image capturing apparatus;
   detecting a moving amount of a subject;
   and displaying information which is related to a calculated difference between the detected panning amount of the image capturing apparatus in the exposure duration and the detected moving amount of the subject before a start of the exposure, on a display unit in an exposure duration.

* * * * *